(12) United States Patent
Stoddard et al.

(10) Patent No.: US 11,149,746 B2
(45) Date of Patent: Oct. 19, 2021

(54) UTILITY VEHICLE MOUNTING ACCESSORY FOR LANDSCAPING BLOWER

(71) Applicant: UMount Holdings, LLC, Holland, MI (US)

(72) Inventors: Jeremy C. Stoddard, Holland, MI (US); Kristopher D. Shumaker, Holland, MI (US)

(73) Assignee: Umount Holdings, LLC, Holland, MI (US)

( * ) Notice: Subject to any disclaimer, the term of this patent is extended or adjusted under 35 U.S.C. 154(b) by 90 days.

(21) Appl. No.: 16/802,837

(22) Filed: Feb. 27, 2020

(65) Prior Publication Data

US 2020/0191167 A1    Jun. 18, 2020

Related U.S. Application Data

(63) Continuation-in-part of application No. 15/611,222, filed on Jun. 1, 2017, now Pat. No. 10,609,874.

(51) Int. Cl.
*F04D 29/60* (2006.01)
*A01G 20/47* (2018.01)

(52) U.S. Cl.
CPC ........ *F04D 29/601* (2013.01); *A01G 20/47* (2018.02)

(58) Field of Classification Search
CPC ........ A01G 20/43; A01G 20/47; F04D 29/601
See application file for complete search history.

(56) References Cited

U.S. PATENT DOCUMENTS

| | | | |
|---|---|---|---|
| 5,722,110 A | 3/1998 | McIntyre et al. | |
| 7,240,891 B2 | 7/2007 | Hafendorfer | |
| 7,603,738 B1 | 10/2009 | Woodcock et al. | |
| 2007/0214600 A1* | 9/2007 | Block | A47L 5/14 15/405 |
| 2016/0108924 A1 | 4/2016 | Conrad et al. | |

\* cited by examiner

*Primary Examiner* — Andrew A Horton
(74) *Attorney, Agent, or Firm* — Frank M. Scutch, III

(57) ABSTRACT

A landscaping blower mounting accessory for use with a utility vehicle includes a blade connecter mounted to the utility vehicle. A receiving coupler is attached to the landscaping blower and shaped to receive the blade. A landscaping blower is oriented so that a housing covering a blower impeller is positioned between the utility vehicle and the blower motor. The mounting assembly allows the blade to frictionally engage within the coupler for holding the landscaping blower in a fixed positon above the ground on the front of the utility vehicle.

20 Claims, 8 Drawing Sheets

UTILITY VEHICLE MOUNTING ACCESSORY FOR LANDSCAPING BLOWER

FIELD OF THE INVENTION

The present invention relates generally to landscaping blowers and more particularly to a mounting accessory for attaching a landscaping blower to a utility vehicle or commercial mower.

BACKGROUND

Commercial landscaping blowers are well known and come in various shapes, sizes and configurations. Walk behind blowers are powerful and easy to use in hilly terrain or large open areas. However, the walk behind blower does not offer air velocity sufficient to blow large quantities of leaves nor is it mountable. Further, because the walk behind blower can take a lot of time to blow small quantities of leaves or debris, it makes it tiresome to use often making it an impractical choice in many blowing situations.

Other blower arrangements include a pull behind blower that is typically supported using its own independent wheel and carriage assembly for separately supporting the blower apart from its mower or vehicle. Although this type of blower can deliver high volumes of air over a large area, this configuration makes maneuvering and transporting inconvenient. Forward speed and overall vehicle gas mileage are also reduced in view of the excessive drag introduced by the supporting carriage. While in use, the operator must look rearward making this style of blower inconvenient and too large for many blowing applicators. Still other blowers are self-propelled and use a stand-on arrangement where the operator stands on a platform and is pulled behind the blower while in motion.

Finally, there are power take-off (PTO) type blowers. The PTO blower is rear mounted to a vehicle which is typically behind a farm implement or tractor. The PTO blower uses the tractor's motor to partially provide drive power to a blower turbine motor. The PTO blower is heavy, rear mounted, cumbersome to use having no adjustment for vertically mounting the blower air exhaust above ground.

Those skilled in the art will recognize that the manner upon which the blower is mounted to the vehicle is important since it directly affects performance, efficiency and its ease of use. Prior art blowers require either its own supporting wheel(s), support carriage, external drive power while the blower nozzle's vertical height cannot be easily adjusted in relation to the ground.

Utility vehicles and commercial mowers such as those made for off-road use are commonly used for many types of land management tasks on golf courses, cemeteries and county clubs. The utility vehicle often uses accessories that can be temporarily mounted directly to the vehicle requiring it be carried without use of an independent ground supported wheel base for the accessory. These types of machines include mower cutting decks, snow plows and/or leaf blowers.

An issue in attaching these accessories often involves the steps involved in attaching and/or detaching the accessory from the vehicle. In some cases, the accessory may be very heavy and a complex mount can make it difficult for one or more persons to fasten or unfasten the accessory to the vehicle. Thus, the need exists for a simple accessory mounting arrangement for use with small utility type vehicles or commercial mowers.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
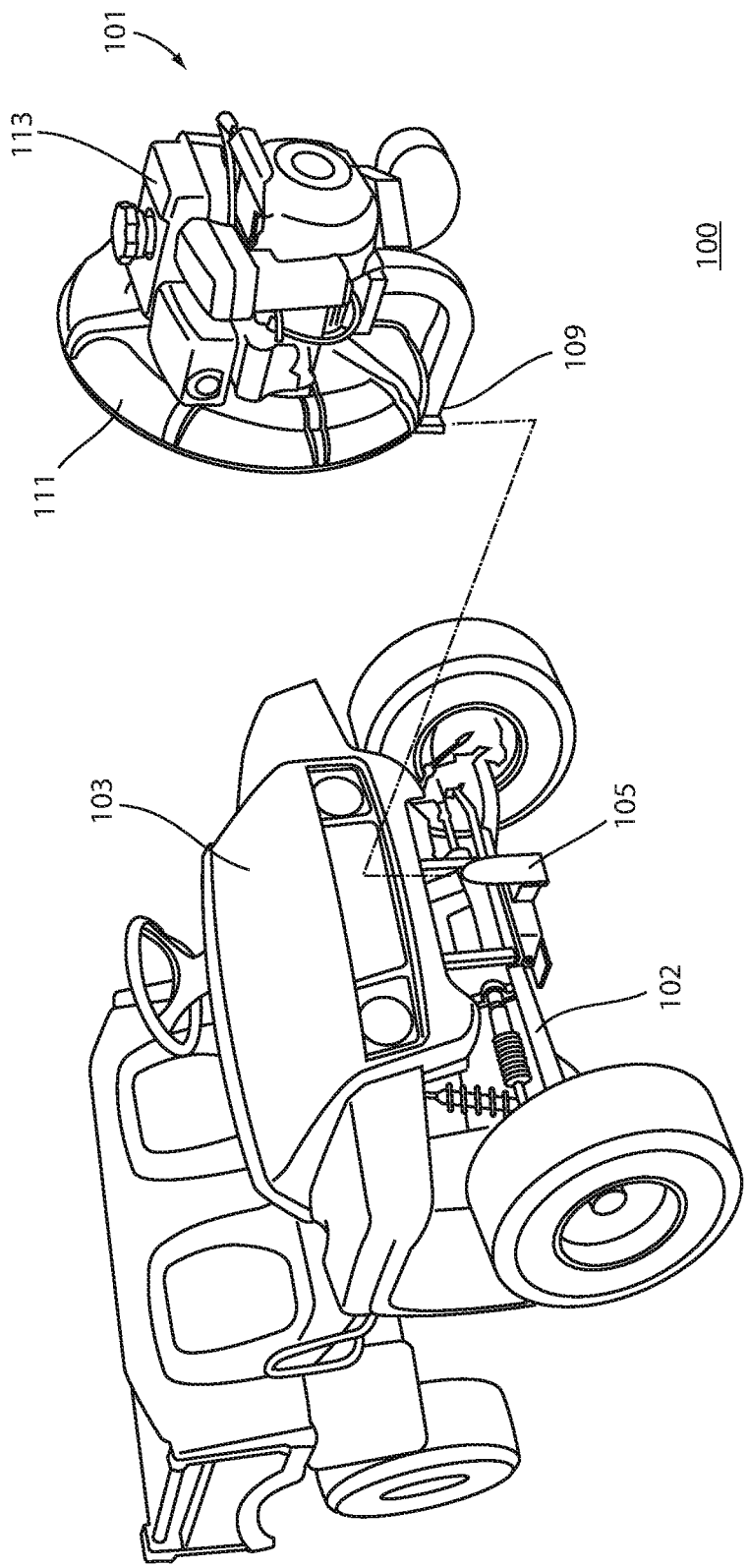
FIG. 1 is an exploded view illustrating the utility vehicle mounting assembly and how the blower mounts to the front of a utility vehicle.

Before describing in detail embodiments that are in accordance with the present invention, it should be observed that the embodiments reside primarily in combinations of method steps and apparatus components related a mounting system for a utility vehicle blower. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Embodiment of the present invention describe a self-contained attachable blower system that utilizes a vehicle chassis for carrying and maneuvering towards areas of debris that an operator desires to clear away. FIG. 1 is an exploded view illustrating the utility vehicle mounting assembly and how the blower attaches to the front of a utility vehicle. Those skilled in the art will recognize that a utility vehicle includes is typically a lower horse-power, gasoline or electric vehicle that includes but is not limited to lawn and turf mowing equipment such as a zero-turn mower. Thus, the "utility" vehicle is a vehicle, generally motorized, that is designed to carry out a specific task with more efficiency than a general-purpose vehicle. One example of such a utility vehicle is a Gator® vehicle manufactured by the John Deere Corporation.

In one embodiment, the utility vehicle mounting assembly 100 is used to mount a landscaping blower 101 to a utility vehicle 103. The mounting assembly 100 includes a blade 105 mounted to a front bumper or frame 107 of the vehicle 103. As will be described herein, the blade 105 provides a male attachment point for a receiver 109 attached to a side of the blower 101 so that the blower is mounted with the impeller air intake 111 facing the vehicle and the motor 113 facing outward from the vehicle. The motor 113 may be an electric, natural gas or petroleum powered motor.

Figure 2:
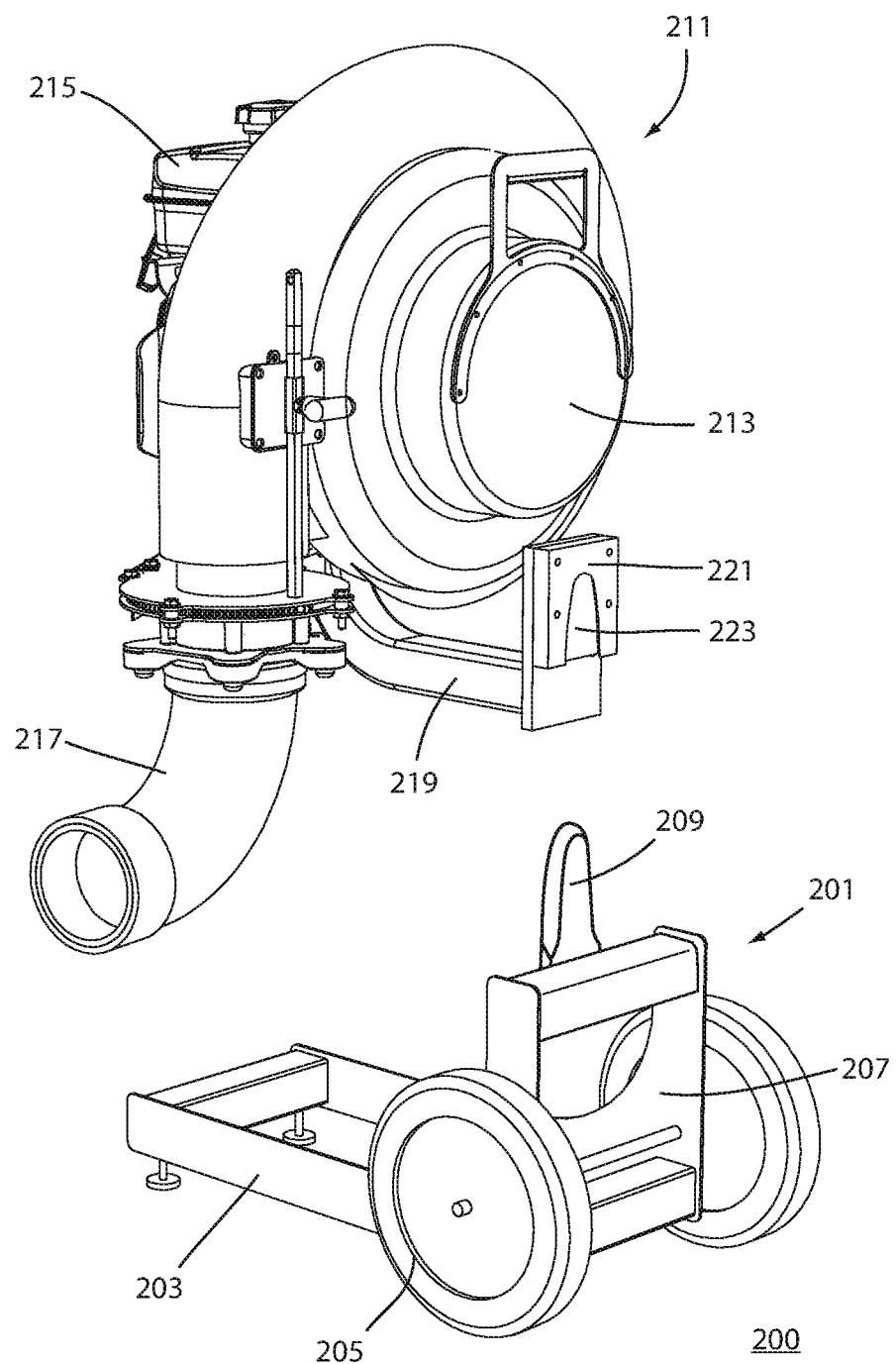
FIG. 2 is an exploded view illustrating a blower mounted to a utility cart. for easy transport.

FIG. 2 is an exploded view illustrating a blower mounted to a storage cart assembly for easy transport. The storage cart assembly 200 includes a storage cart 201 having a supporting frame 203. A plurality of wheels 203 are mounted to the frame 203 allowing the cart to be easily moved. A supporting plate 207 includes a vertical beveled blade 209 having a generally elongated u-shape that protrudes outwardly from the vehicle.

The landscaping blower 211 includes an impeller housing 213, motor 215 and rotatable nozzle 217. A support frame 219 extends under the impeller housing 213 and includes a receiver 221 at its end. The receiver 221 has a notch 223 configured substantially in the shape of the blade 223 so to receive the end of blade 209. In use, the blower 211 is positioned so the receiver 221 moves downwardly in a vertical manner over the blade 209 so the weight of the blower 211 will provide the necessary downward force to hold the receiver 221 on the blade 209 and into an immoveable positon. This cart 201 is used for transporting the blower 211 into a positon so it can be used with the utility vehicle as well as storing the blower when not mounted to the vehicle. In use, the cart 201 can be rolled into position and then lifted on the utility vehicle to transfer the weight of the blower. Those skilled in the art will recognize that other configuration of the blade are possible for example, a blade having a lower taper that increases in diameter or alternatively, a blade having one or more spring loaded finger(s) that can engage with one or more slots in the receiver.

Figure 3:
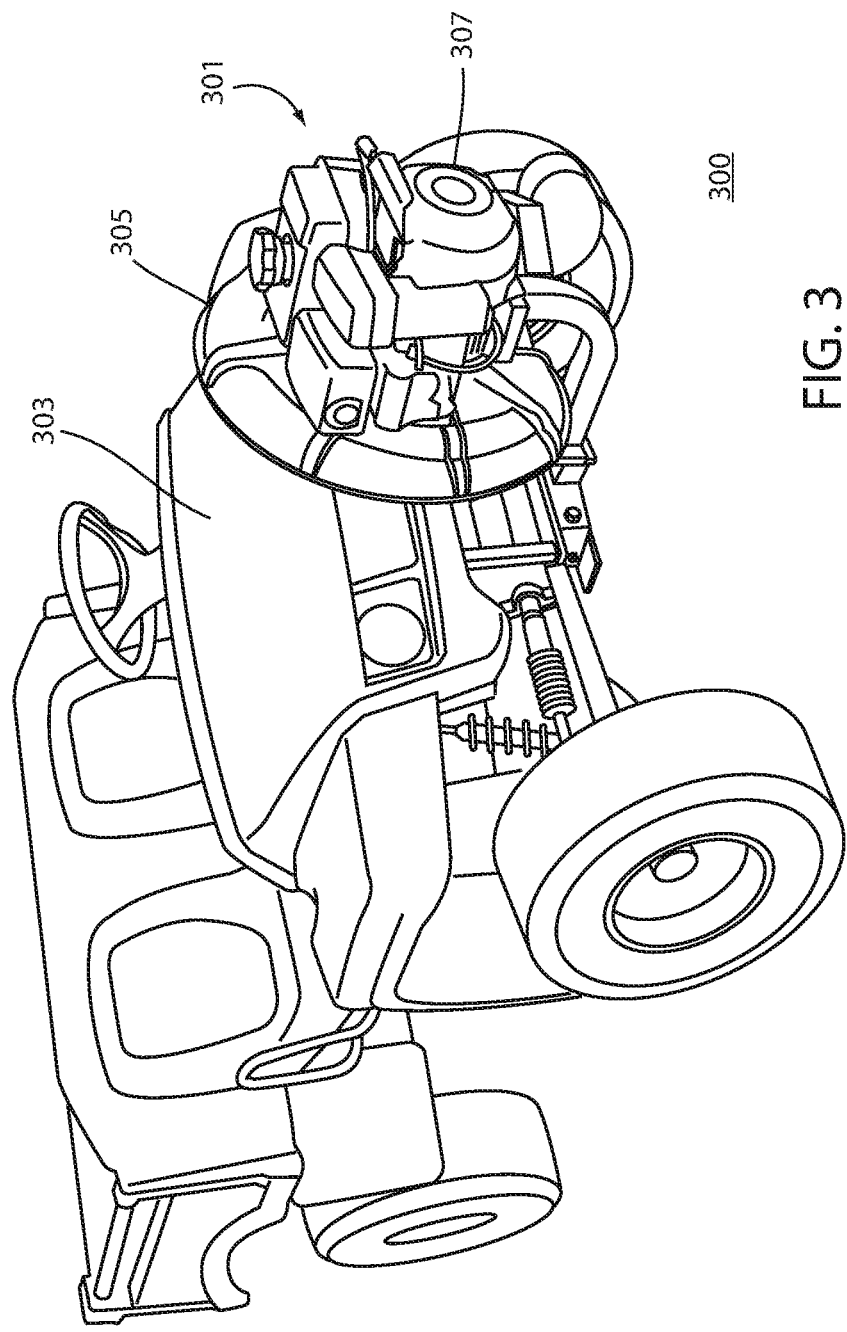
FIG. 3 a perspective view illustrating the blower mounted to the front of the utility vehicle such that the blower motor is outside of the housing.

FIG. 3 a perspective view illustrating the blower mounted to the front of the utility vehicle such that the blower motor is facing outside of the housing. The blower mounting assembly 300 includes the landscape blower 301 mounted to the front end of a utility vehicle 303. A unique embodiment of the invention is that the blower 301 is configured in a manner so that the impeller housing 305 is positioned between the front of the utility vehicle 303 and the blower motor 307. In other words, the blower motor 307 is configured so to be positioned forward and/or outwardly of the impeller housing 305. This allows the blower 301 to be attached to the vehicle so the blower exhaust is in close proximity to the front wheel axle. This configuration insures greater protection of the blower nozzle against impact during motion.

Those skilled in the art will recognize that not all utility vehicles use a single front axle but instead may use different forms of independent wheel suspension. No matter the type of wheel attachment, embodiments of the invention allow the landscape blower 301 to be mounted so that the blower's exhaust nozzle is substantially close to the front wheel and the ground. This allows the blower 301 and its blower nozzle to effectively blow substantially horizontally close to the ground, when in motion, so to be in unison with the vehicle chassis as well as with the terrain or other objects moving under the wheel. Because of this mounting configuration, no additional wheels or wheel carriage are needed to support the weight of the blower. This arrangement, where the motor is forward of the impeller housing, also works to prevent damage to the blower nozzle as it is not as likely to strike the ground when moving uphill or objects that move under the wheel. Moreover, this configuration also has the benefit of reducing engine noise because the blower motor is furthest away from the operator. This reduces fatigue when using such landscaping blowers over long periods of time.

Figure 4:
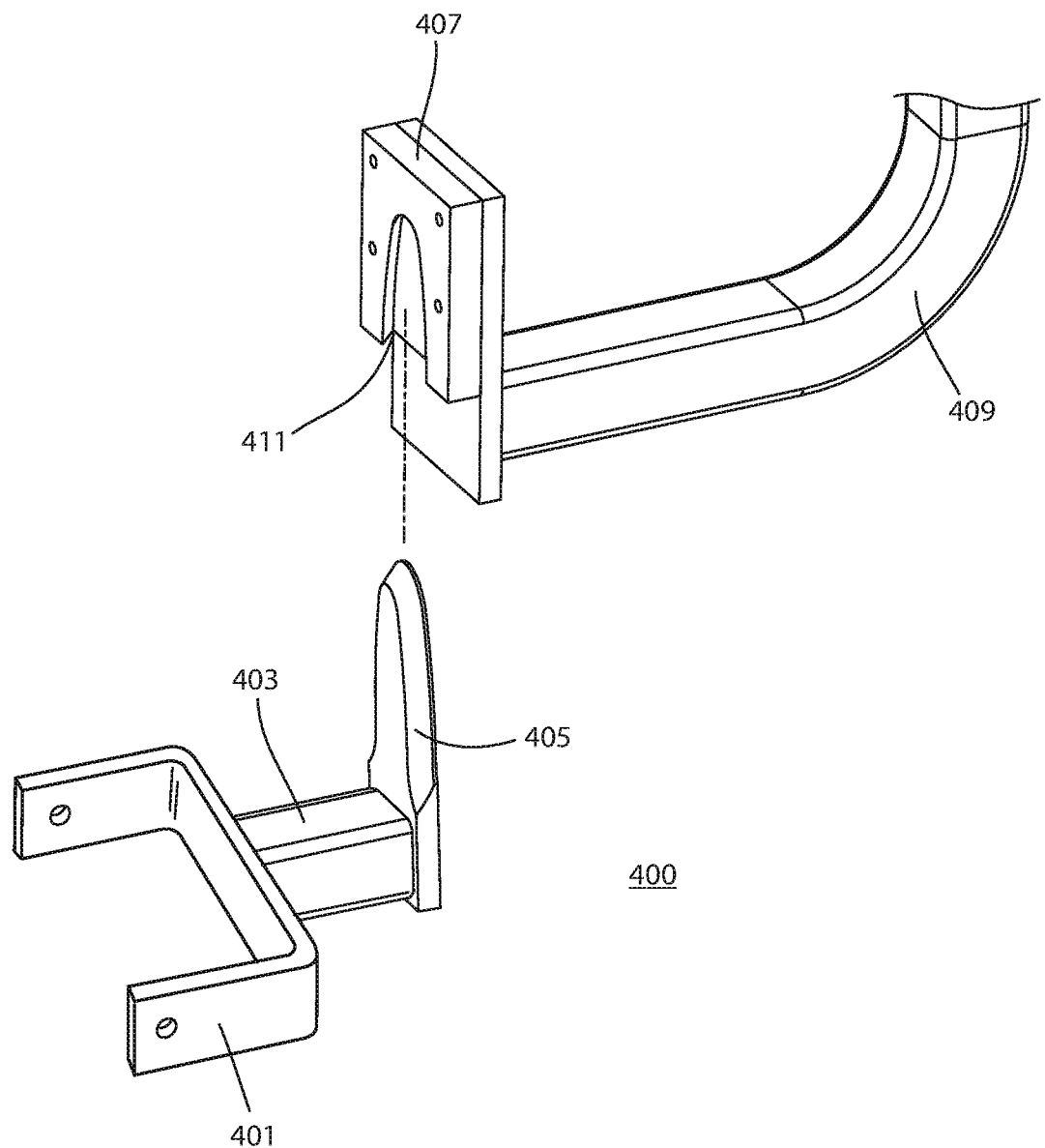
FIG. 4 is a perspective view illustrating how the mount blade mates with the receiver.

FIG. 4 is a perspective view illustrating how the mounting blade mates with the receiver. The mounting assembly 400 includes a C-shaped bracket 401 connected to arm 403. The arm 403 is attached to the blade 403 that extends substantially vertically and is configured in an elongated U-shape. As described herein, the blade 403 is used with a mounting plate 407 and receiver 411. The receiver 411 is in a dovetail-like shape and includes void configured with the mounting plate 407 that is substantially in the shape of the blade 403. The mounting plate 407 is attached to the blower using arm 409. In use, the blade 405 is frictionally engaged with the receiver 411 and is held into position by the weight of the blower so that the mounting assembly 400 holds the blower into a rigid and/or fixed position. Those skilled in the art will recognize that different vehicles already in the marketplace may have different types of mounting systems. Some mounting systems are simple while others are more complex however all will allow the use of the male/female coupler as described herein.

Figure 5:
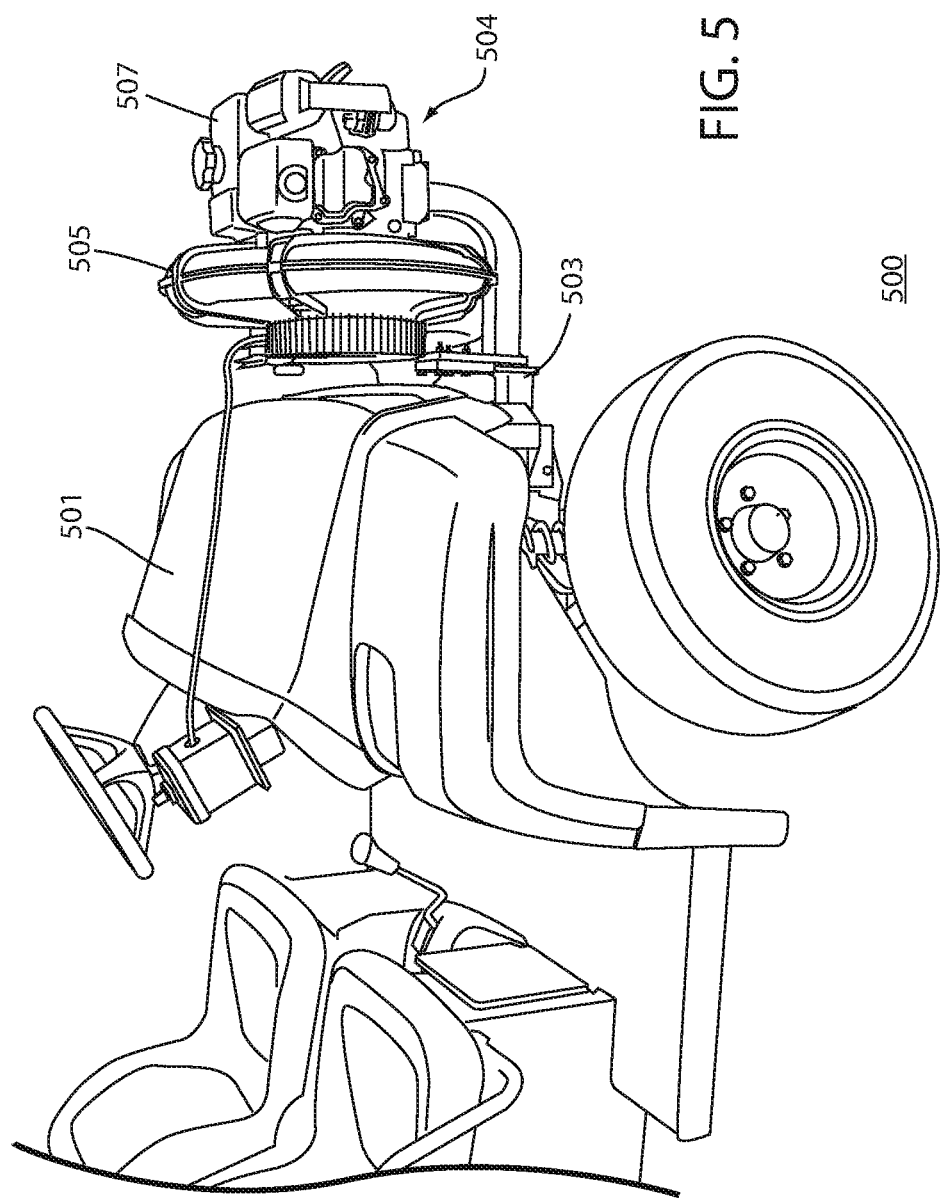
FIG. 5 is an elevated side view illustrating the blower mounted to the front of the utility vehicle.

FIG. 5 is an elevated side view illustrating the blower mounted to the front of the utility vehicle using the blower mounted assembly as described herein. The blower mounting assembly 500 includes the utility vehicle 501 showing the blade engaged within the receiver 503. This allows the blower 504 to be specifically configured so the impeller housing 505 is located between the utility vehicle 501 and the blower motor 507.

Figure 6:
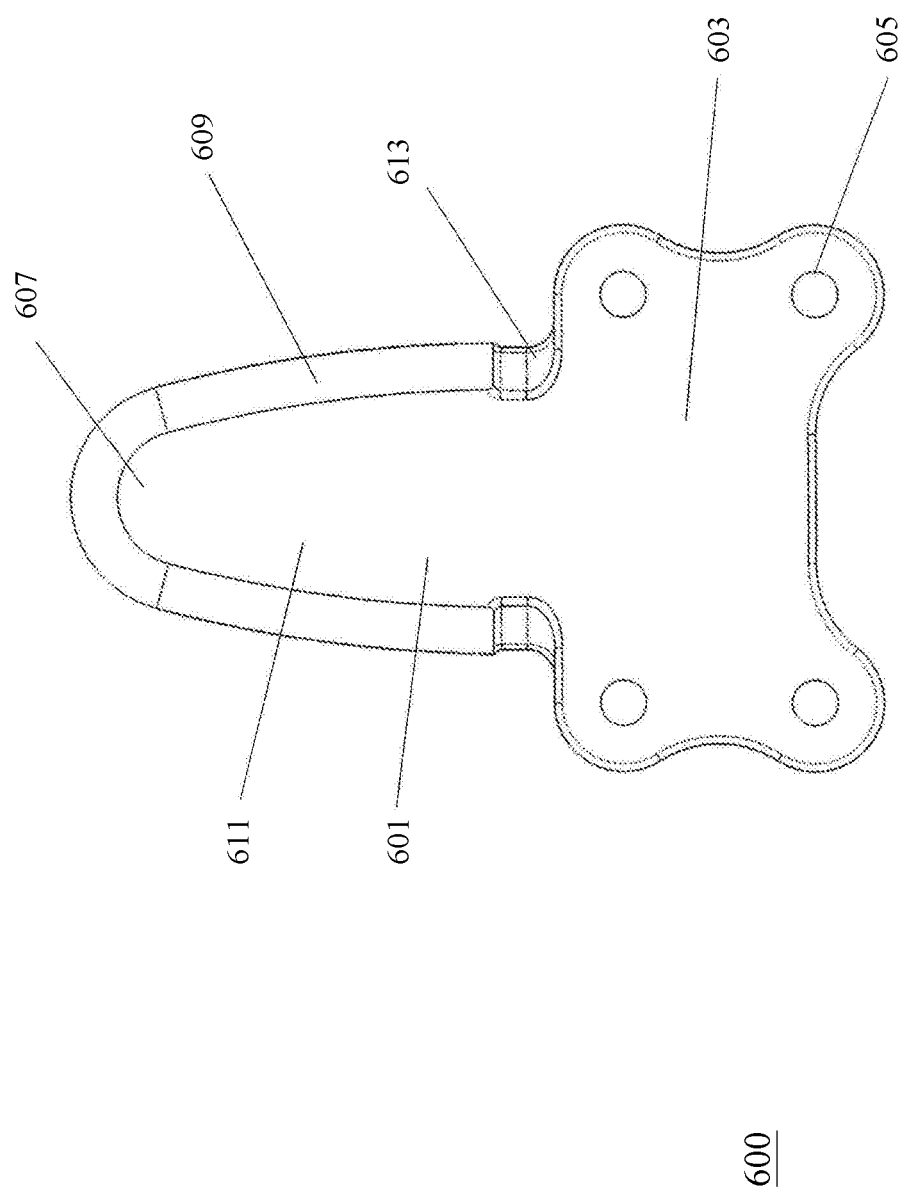
FIG. 6 is a front view of a male coupler according to an embodiment of the invention.

FIG. 6 is a perspective view of the attachment male coupler 600 used in the coupler assembly. As seen in FIG. 1, the attachment male coupler 600 includes a blade 601 and base portion 603. The base portion is substantially square in shape and includes fastening holes 605 for securely fasting the base 603 to a surface of the utility vehicle. The surface where the base is mounted will depend on the type of accessory. For example, a blower accessory might be more easily mounted to the front of the utility vehicle. A grass clipping bag accessory might be best mounted on the side or rear of the vehicle.

The blade 601 extents to a rounded edge 607. The rounded edge 607 is a parabolic segment that extends between a line parallel to a fixed line between edges of the blade 601. The blade 601 further includes a chamfered edge 609 that slopes downwardly from the top surface 611. A plurality of notches 613 are formed where the blade 601 joins the base 603.

Figure 7:
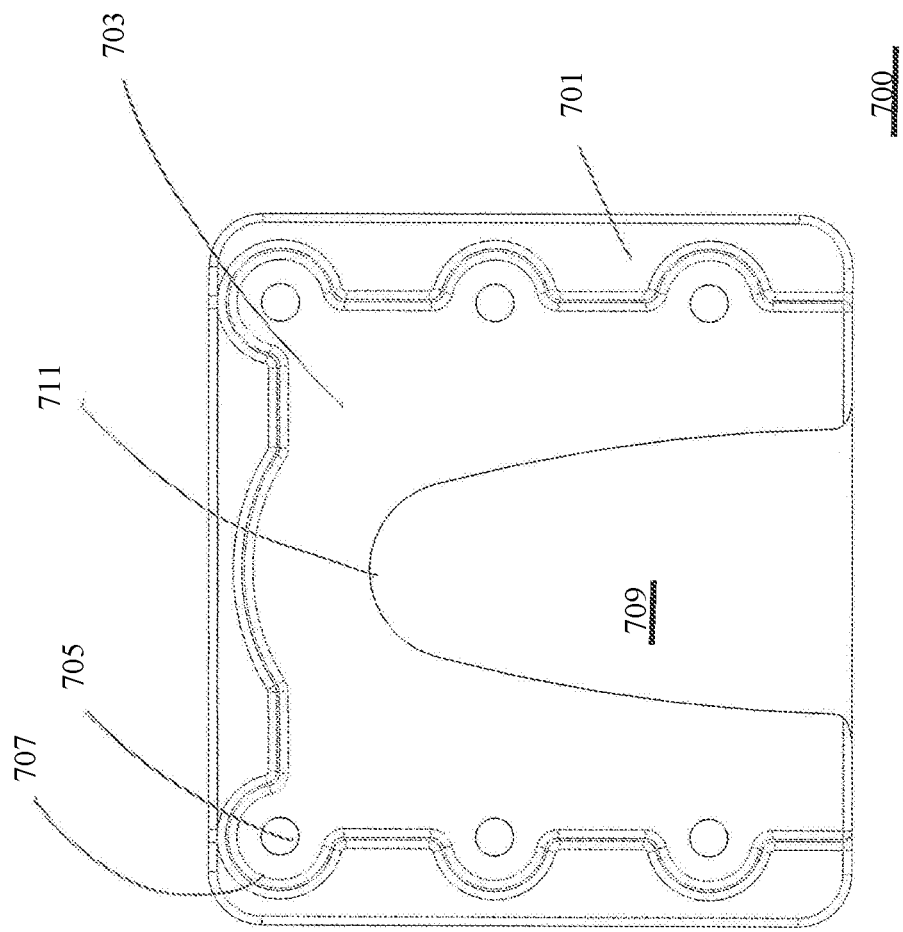
FIG. 7 is a front view of a female coupler according to an embodiment of the invention.

FIG. 7 is a front view of a female coupler according to an embodiment of the invention. The female coupler 700 includes a base 701 having a frame 703 mounted and/or formed therein. The frame 703 includes a plurality of mounting holes 705 that are formed within a rounded casing 707. The frame 703 is raised above the base 701 so to allow the male coupler 600 to be positioned within channel 709. Those skilled in the art will recognize that the channel 709 has a rounded top 711 and is sized and shaped as an elongated parabola with an internal chamfered edge to tightly accept the male coupler 600 therein.

Figure 8:
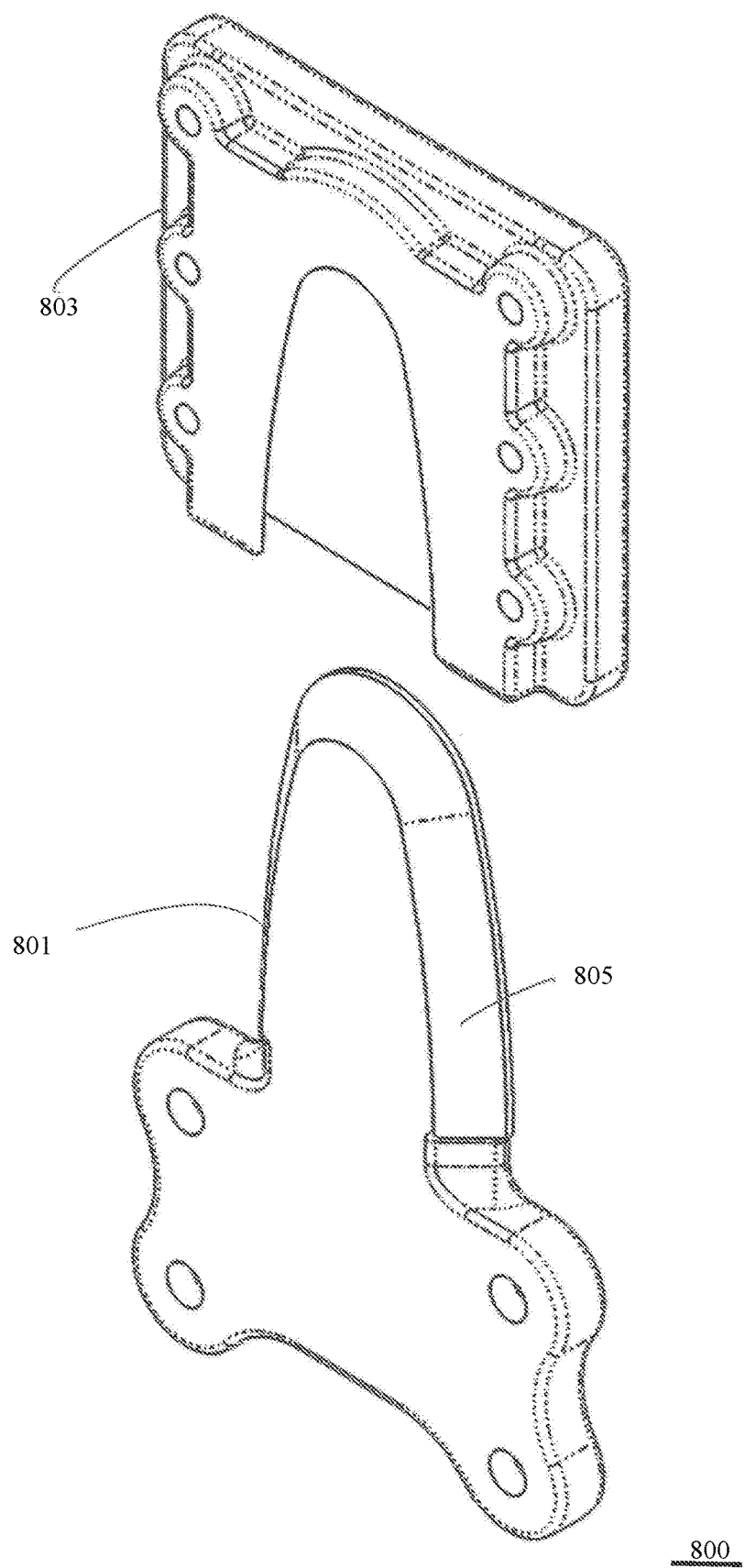
FIG. 8 is a perspective view illustrating the coupler assembly according to an embodiment of the invention.

FIG. 8 is a perspective view illustrating the male coupler and female coupler forming the coupler assembly according to an embodiment of the invention. In use, the male coupler 801 is typically mounted to the utility vehicle. For example, with a blower motor, it may be mounted on the front of the vehicle on or near the front bumper. The accessory will include the female coupler 803. In order to securely fasten the accessory to the vehicle, the accessory is raised so that it can be positioned over the male coupler 801. Since the male coupler 801 includes a chamfered edge 805, the weight of the accessory will facilitate movement of the female coupler 803 over the beveled edge so the accessory is frictionally engaged firmly in position over the male coupler without movement. When ready to be removed, all that is necessary is to lift the accessory and female coupler 803 from the male coupler 801 where the accessory can be stowed for future use. No tools or complex assembly/disassembly mechanism is required.

The coupler assembly 800 provides an uncomplicated, two-part assembly allowing for the quick and easy attachment and detachment of landscaping accessories from a utility vehicle. The coupler assembly is tight fitting requiring no tools to operate allowing for the easy and hassle-free use by a single user/operator. A novel aspect of the invention is that the coupler assembly allows for the simple alignment of the female coupler to male coupler. Once mounted, the coupler's unique size and shape is easily releasable providing a slop-free fitment of the accessory to the utility vehicle. Finally, the coupler assembly is manufactured of metal or durable plastic and is substantially robust allowing future accessories such as large and small leaf blowers, weight kits, storage trays and fertilizer spreaders, spray tanks, hose reels and other accessories related to ground maintenance to use the same coupling assembly with a single vehicle.

Hence, the present invention is directed to a landscaping blower mounting and coupling assembly that includes a landscaping blower having a motor and a shroud. A blade is attached to the front end of the utility vehicle and a receiver is attached to a landscaping blower for receiving the blade so to support the landscaping blower. The blower mounting assembly allows the landscaping blower to be configured so the impeller housing is positioned between the blade and the blower motor.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A landscaping blower mounting accessory comprising:
   a landscaping blower having a motor and an impeller housing;
   a male coupler for attachment to the front end of a utility vehicle;
   a female coupler attached to a landscaping blower for receiving the male coupler so to support the landscaping blower; and
   wherein the landscaping blower is configured so the impeller housing is positioned between the male coupler and the blower motor.

2. A landscaping blower mounting accessory as in claim 1, wherein the male coupler comprises:
   a blade having a rounded top end;
   a substantially square base supporting the blade and having a plurality of mounting holes for mounting the base to the utility vehicle; and
   where the blade includes a chamfered edge substantially surrounding both sides of the blade.

3. A landscaping blower mounting accessory as in claim 1, wherein the female coupler comprises:
   a frame having a channel formed therein for enabling the blade to easily engage with the female coupler; and
   wherein the female coupler is mounted to the accessory and positioned over the male coupler to hold the accessory to the utility vehicle.

4. A landscaping blower mounting accessory as in claim 1, wherein the landscaping blower is configured so a blower exhaust is positioned substantially near a front wheel of the utility vehicle.

5. A landscaping blower mounting accessory as in claim 1, wherein the blade is mounted on the front of the utility vehicle and configured between the vehicle's front wheels.

6. A landscaping blower mounting accessory as in claim 1, wherein the landscaping blower is configured so landscaping blower air exits from a rotational nozzle.

7. A landscaping blower mounting accessory as in claim 1, wherein the female coupler includes at least one bracket for mounting the female coupler to the landscaping blower.

8. A landscaping blower mounting accessory as in claim 1, wherein the female coupler includes a void configured substantially in the shape of the male coupler.

9. A landscaping blower mounting assembly for use with a utility vehicle comprising:
   a blade connecter mounted to the utility vehicle;
   a coupler attached to the landscaping blower and shaped to receive a blade;
   a landscaping blower oriented so that a housing covering a blower impeller is positioned between the utility vehicle and a blower motor; and
   wherein the blade frictionally engages within the coupler for holding the landscaping blower in a fixed positon above the ground on the front of the utility vehicle.

10. A landscaping blower mounting assembly as in claim 9, wherein the orientation of the blower allows a blower nozzle to be positioned close to a front wheel of the utility vehicle.

11. A landscaping blower mounting assembly as in claim 9, wherein the blade connector is configured to be between front wheels of the utility vehicle.

12. A landscaping blower mounting assembly as in claim 9, wherein the landscaping blower is configured so landscaping blower air exits from a moveable nozzle assembly.

13. A landscaping blower mounting assembly as in claim 12, wherein the nozzle assembly is rotatable.

14. A landscaping blower mounting assembly as in claim 9, wherein the blade connector includes at least one bracket for mounting the blade to the landscaping blower.

15. A landscaping blower mounting assembly for mounting accessories to a utility vehicle comprising:
   a male coupler having:
   a blade having a rounded top end;

a substantially square base supporting the blade and having a plurality of mounting holes for mounting the base to the utility vehicle;

where the blade includes a chamfered edge substantially surrounding both sides of the blade;

a female coupler having:

a frame having a channel formed therein for enabling the blade to easily engage with the female coupler; and wherein the female coupler is mounted to the accessory and positioned over the male coupler to hold the accessory to the utility vehicle.

16. A landscaping blower mounting assembly as in claim 15, wherein the chamfered edge slopes downwardly from the top surface to the bottom surface.

17. A landscaping blower mounting assembly as in claim 15, wherein the attachment male coupler has a substantially flat top surface and a substantially flat bottom surface.

18. A landscaping blower mounting assembly as in claim 15, further includes a notch portion at the intersection between the blade and the base.

19. A landscaping blower mounting assembly as in claim 15, wherein the blade forms a parabolic shape at its end.

20. A landscaping blower mounting assembly as in claim 15, wherein the accessory is at least one from the group of leaf blower, snow blower, fertilizer spreader, weight kit, a sprayer, hose reel, leaf plow or storage tray.

* * * * *